United States Patent [19]
Lunden

[11] 3,904,047
[45] Sept. 9, 1975

[54] LUMBER STACKING APPARATUS
[75] Inventor: Sidney L. Lunden, Spokane, Wash.
[73] Assignee: Moore-Iem, Inc., Spokane, Wash.
[22] Filed: Aug. 16, 1974
[21] Appl. No.: 497,913

[52] U.S. Cl............................ 214/6 M; 214/6 DK
[51] Int. Cl.² ....................................... B65G 57/26
[58] Field of Search ........ 214/6 M, 6 DK, 6 G, 6 H, 214/6 P

[56] References Cited
UNITED STATES PATENTS

| | | | |
|---|---|---|---|
| 3,352,434 | 11/1967 | Zuercher | 214/6 M |
| 3,703,965 | 11/1972 | Coats | 214/6 M |
| 3,738,510 | 6/1973 | Mason | 214/6 DK |
| 3,860,128 | 1/1975 | Lunden | 214/6 M |

Primary Examiner—Robert J. Spar
Assistant Examiner—Leslie J. Paperner
Attorney, Agent, or Firm—Wells, St. John & Roberts

[57] ABSTRACT

A lumber stacking apparatus for successively placing courses of boards one on the other to form a vertical stack, and for automatically placing stickers between the successive courses to vertically separate the courses within the stack. The apparatus includes a course support means on an upright framework operated by a drive means to lift successive courses of boards and stickers, perpendicularly oriented below the courses of boards, at a pickup station. The course and stickers are then moved forward to a stacking station in an oblique forward path relative to the lengths of the boards in the stack. The course and stickers are then lowered in front of stripping members on the framework adjacent the stacking station, and finally the course support means is retracted rearwardly bringing the courses and stickers against the stripping members and thereby depositing them onto the stack below. Sticker support means is provided upon the course support means for the supporting of stickers crosswise relative to the lengths of the boards and for holding the stickers crosswise relative to the lengths of the boards and for holding the stickers in that position against the undersides of the courses as they are moved from the pickup station to the stacking station. Sticker distribution means is also provided to automatically supply stickers to a sticker receiving means for access by the sticker support means.

12 Claims, 6 Drawing Figures

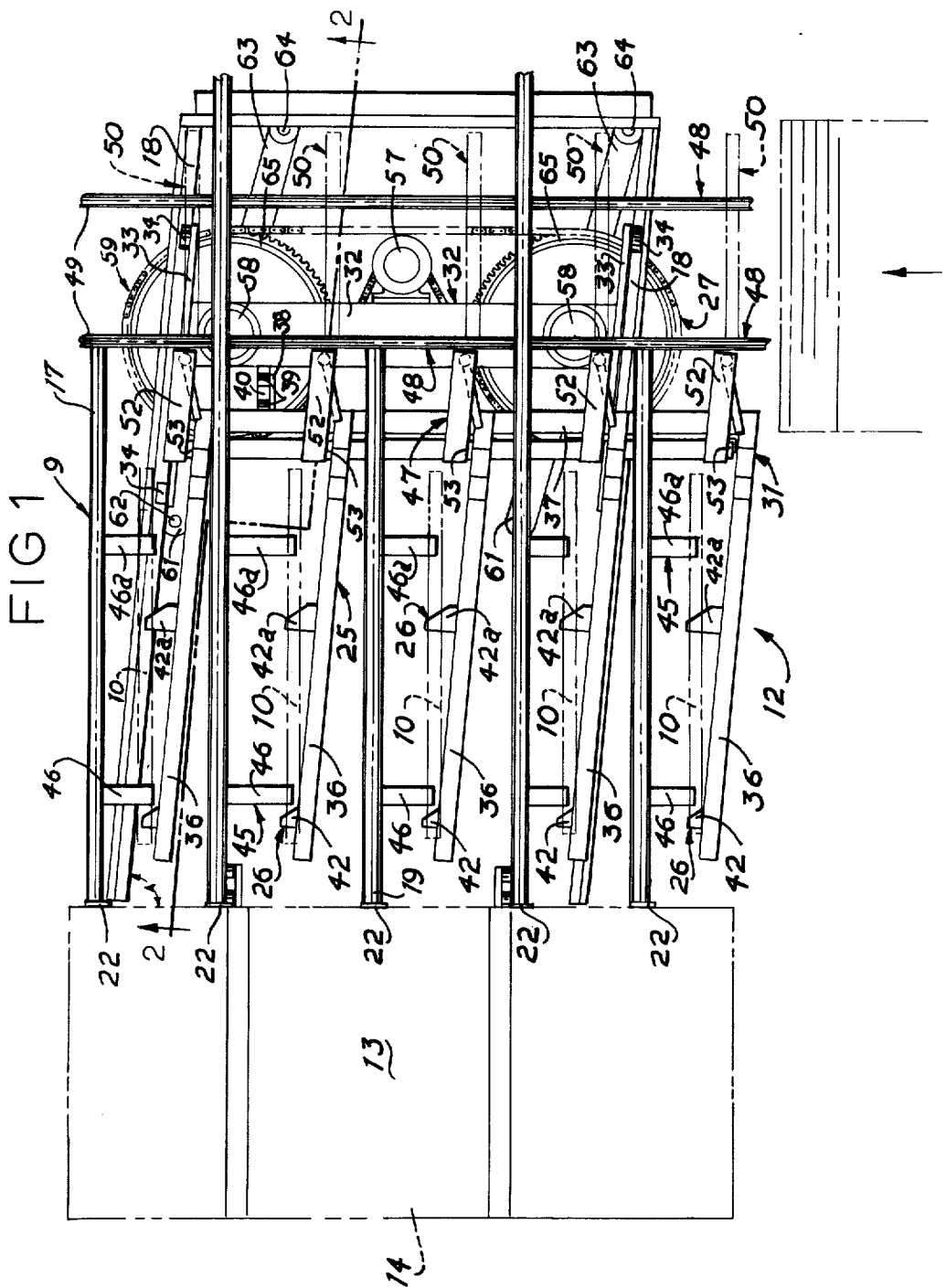

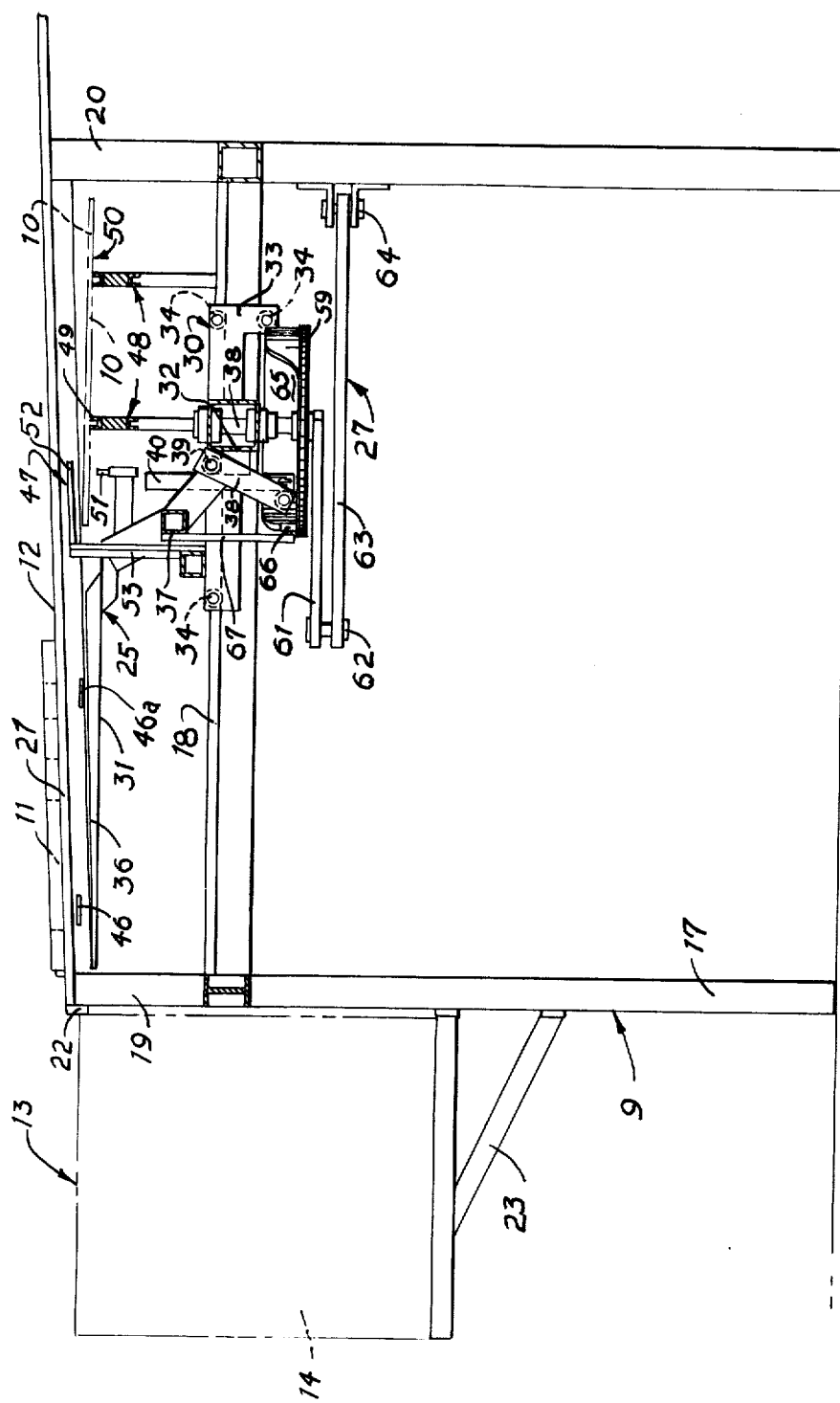

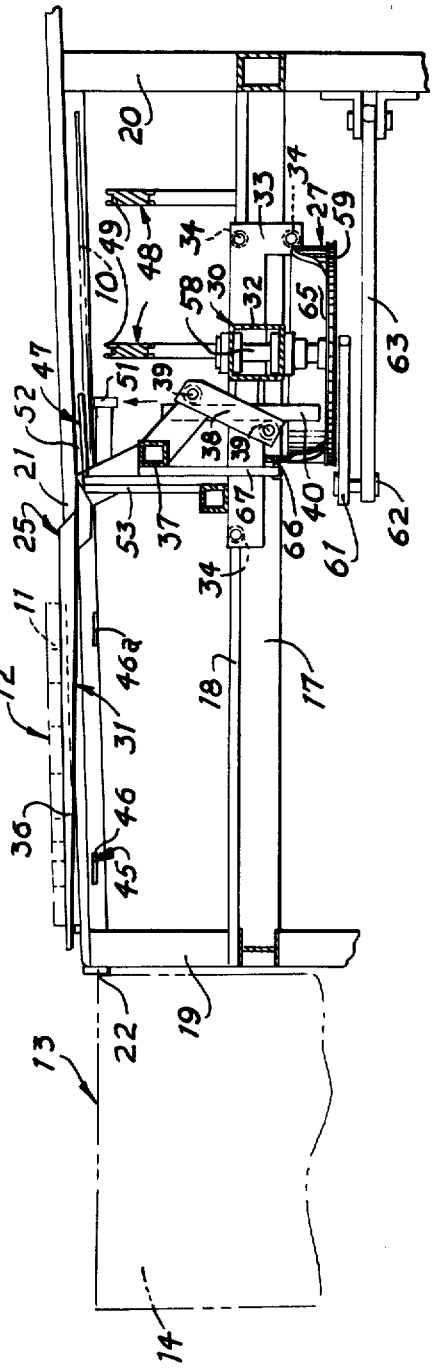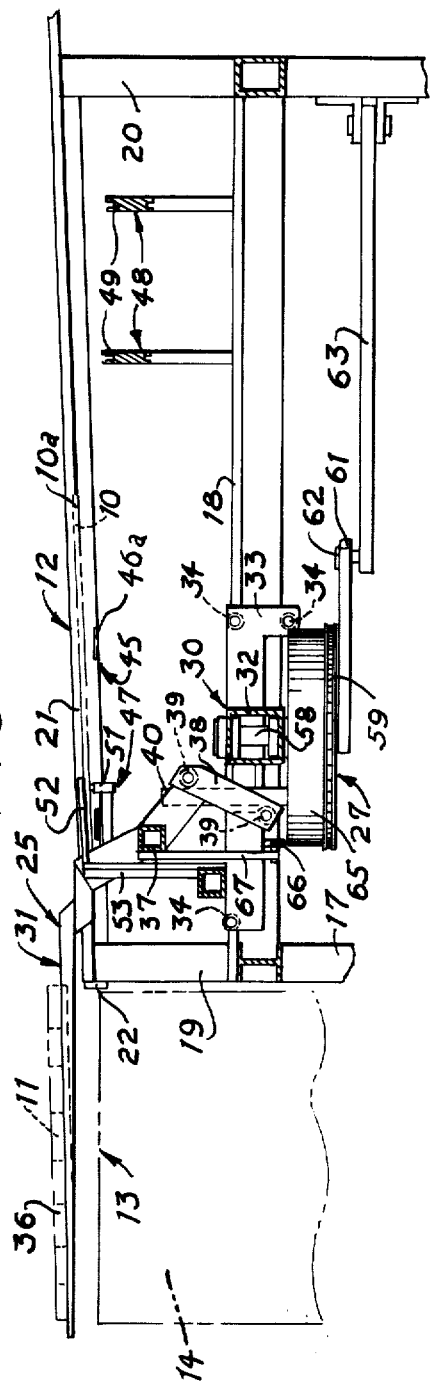

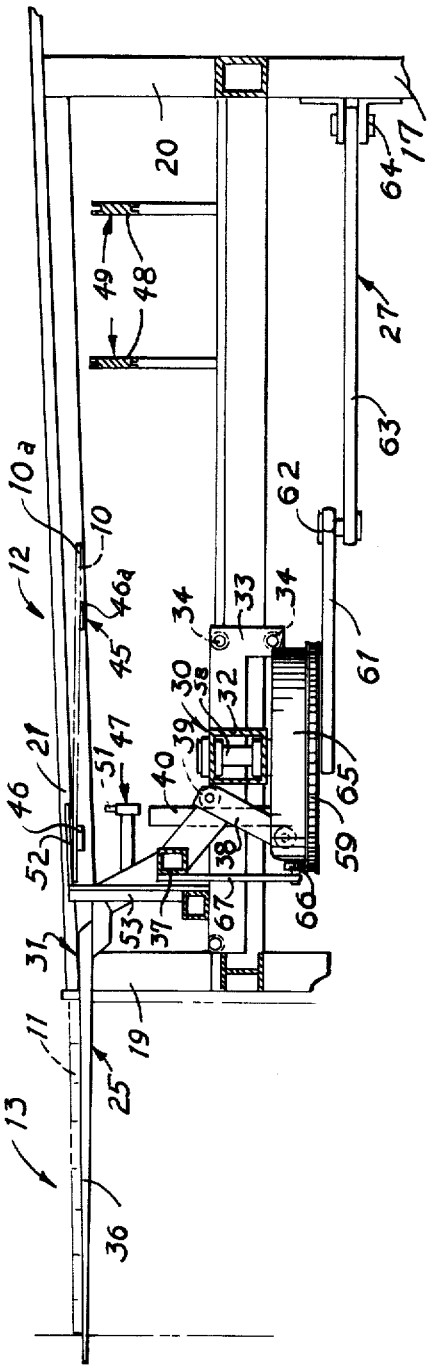
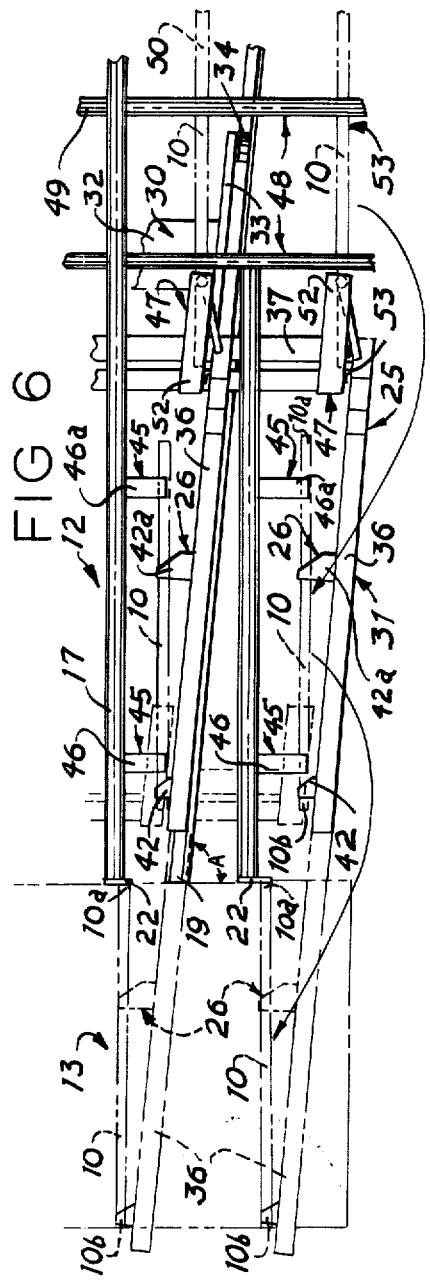

3,904,047

LUMBER STACKING APPARATUS

BACKGROUND OF THE INVENTION

The present invention relates to lumber stacking apparatus and more particularly to such stacking apparatus with provision for automatic placing of stickers between each course of boards in the stack as it is being formed.

It is quickly becoming common practice for modern lumber mills to utilize automatic stacking equipment to form vertical stacks from multiple course of boards. Usually, when the lumber being stacked is "green," stickers or small elongated slats are placed crosswise between the courses to enable quick drying time and reduce warpage. Previously, stickers were placed by hand between successive layers, — whether the stacks were formed by hand or by machine.

Attempts have been made to develop machines for automatically placing stickers between successive layers as the stack is being formed. Such apparatus is generally supplied as an individual machine or as an attachment to existing stacking machinery, working independently but in conjunction with the stacking operation. Such apparatus is usually very expensive and therefore prohibitive for small mill operators to purchase.

I have disclosed in pending U.S. application, Ser. No. 382,740, a sticker placing device for lumber stacking machines wherein stickers are taken from a single magazine and automatically placed between successive layers of boards in response to operation of the lumber stacking machine. The stacking machine basically includes a number of fork arms that are reciprocated on a stationary frame to: (1) lift a course of boards at a pickup station; (2) move the course over stripping members on the frame to a stacking station; (3) lower the course in front of the stripping members; and (4) retract to strip the course onto the stack. The fork arms move along a path perpendicular to the lengths of the boards in the stack.

The sticker placing device is highly efficient in delivering stickers to positions on the lumber stacking machine where they can be moved by sticker support brackets on the fork arms, upwardly against the underside of a layer and, subsequently, be placed onto the stack. The stickers are moved in a path perpendicular to the lengths of the boards in the stack, from an indexing conveyor, to intermediate positions on the stacking machine, and finally to positions on the stack. In order to deposit the stickers onto the stack, stripping members are provided adjacent the stack that must be moved into the paths of the stickers as the fork arms are retracted rearwardly to strip the course onto the stack. The stripping members must also be moved out of the rearward paths of the sticker support brackets previously used to support the stickers beneath the layer.

A cam and follower arrangement are utilized to operate in response to the stacking machine to appropriately move the stripping members in a timed sequence into and out of the paths of the stickers and sticker support brackets. Although this arrangement is serviceable, it involves the use of several moving parts that necessarily increase the cost of the machine, maintenance frequency and expense.

It is therefore a primary object of the present invention to provide an improved lumber stacking apparatus with integral sticker placing mechanisms that requires only stationary stripping members to cause the stickers to be placed on a stack.

A further object is to provide such a stacking apparatus that is simple in construction and may therefore be priced within means of small mill operators.

These and other objects and advantages will become apparent upon reading the following description which, taken with the accompanying drawings, disclose a preferred form of the present invention.

BRIEF DESCRIPTION OF THE DRAWINGS

A preferred form of the present invention is illustrated in the accompanying drawings in which:

FIG. 1 is a plan view of the present apparatus;

FIG. 2 is a sectional elevational view taken along line 2—2 in FIG. 1;

FIGS. 3–6 are diagrammatic operational views of the apparatus.

DETAILED DESCRIPTION OF A PREFERRED EMBODIMENT

The stacking machine embodying a preferred form of the present invention is illustrated in the drawings and designated by the reference numeral 9. Stacking machine 9 is utilized to: (a) receive a course of boards 11 and a number of stickers 10 as shown in FIGS. 2–5; (b) lift the course 11 and stickers 10 at a pickup station 12; (c) move the course 11 and stickers 10 forward and laterally in an oblique or diagonal path to a stacking station 13; (d) lower the course 11 and stickers 10 toward a stack 14; and (e) strip the course and stickers onto the stack.

The stacking machine 9 includes an upright framework 17 having a transversely spaced pair of tracks 18 thereon oriented diagonally at an oblique angle "A" relative to the longitudinal orientation of stack 14, (FIG. 1). Tracks 18 extend diagonally between a rearward frame end 20 at station 12 and a forward frame end 19 at station 13. Framework 17 also includes an upper support surface 21 for receiving the successive courses of boards 11.

Stationary stripping members 22 are provided at forward frame end 19. Members 22 enable successive courses of boards 11 and stickers 10 to be deposited onto stack 14.

A vertically-movable hoist 23 (FIG. 2) is also provided at forward frame end 19 to support stack 14 and index downwardly after receiving a course of boards thereon to maintain the top surface of the stack at a constant elevation. As an alternate arrangement, the apparatus is applicable for use in conjunction with a hoistless version such as shown in U.S. Pat. No. 3,437,215.

A course support means 25 is movably mounted on framework 17 for engaging and moving successive courses 11 along an oblique or diagonal path as determined by tracks 18 from pickup station 12 forwardly and laterally to stacking station 13. A sticker support means 26 is provided for operation in response to course support means 25 to position stickers received from a sticker feeding mechanism 48, crosswise beneath the course 11 at the pickup station 12, and move the stickers obliquely — forwardly and laterally with each course 11 to stacking station 13. A drive means 27 is provided to operate course support means 25 and sticker support means 26 to move as described in continuous operation cycles.

In describing my invention in greater detail, particular emphasis is first directed to course support means 25 as shown in FIGS. 1 and 2. Support means 25 is shown comprising a carriage 30 and a fork arm assembly 31. Carriage 30 is mounted on tracks 18 for movement along the oblique or diagonal path as guided by tracks 18. The obliquity as referred to is with reference to the longitudinal orientation of the boards in stack 14. Angle A, as indicated FIGS. 1 and 6 shows this orientation clearly.

Carriage 30 includes a transverse cross member 32 having longitudinal end sections 33 at each end thereof. Rollers 34 are mounted to end sections 33 for free rotation engagement on tracks 18.

Fork arm assembly 31 is movably mounted to carriage 30 for vertical movement thereon. Assembly 31 is comprised of a plurality of forwardly extending cantilevered fork arms 36. Each fork arm 36 is connected to a common transverse cross bar 37. Arms 36 extend forward from bar 37 parallel with the oblique path of movement of carriage 30. Cross bar 37 and fork arms 36 are mounted for vertical movement relative to carriage 30, to an upright pair of tracks 40 on carriage 30 by a set of rollers 39. Rollers 30 are rotatably mounted to yokes 38 provided on cross bar 37. Up and down movement of the fork arms 36 and reciprocating movement of course support means 25 is affected by drive means 27.

Stickers 10 are automatically fed, by sticker feeding mechanism 48, to a sticker receiving means 45 on framework 17 at the pickup station 12. Feeding mechanism 48 delivers stickers to receiving means 45 upon each operational cycle of the stacking machine.

Various types of sticker feeding mechanisms may be utilized to feed stickers to receiving means 45. A detailed description of an applicable mechanism is contained in U.S. application Ser. No. 382,740 filed on July 26, 1973 by the same applicant. Such application is incorporated herein as background material.

Sticker feeding mechanism 48 is coordinated to operate with course support means 25 and to deliver a prescribed number of stickers automatically from a source (not shown) to sticker receiving means 45 for each course 11 delivered to stack 14.

Feeding mechanism 48 includes a transverse conveyor 49 that supplies stickers continuously from the source to selected sticker positions 50 behind pickup station 13 (as indicated by phantom lines in FIG. 6). As shown, the stickers are oriented with their lengths perpendicular to the lengths of the boards within the stack.

Stickers are removed from the sticker position 50 and moved diagonally forwardly and laterally in coordination with course support means 25, to the sticker receiving means 45. This operation is accomplished sequentially (as shown in FIGS. 3, 4 and 5) by an unloading means 47. Unloading means 47 is utilized to remove stickers from conveyor 49, move them along the oblique path to pickup station 13, and release them onto receiving means 45. Unloading means 47 is comprised of upright post 51 and a horizontal member 52 for each sticker position 50. Posts 51 are fixed to the vertically movable fork arm assembly 31 and positioned elevationally below the sticker position 50 when the course support means 25 is located at the pickup station 12. Members 52 are fixed to upright bars 53 on carriage 30, also with one channel for each sticker position 50. The member 52 is positioned elevationally above posts 51 at the selected sticker positions 50 when the course support means is located at pickup station 12.

Posts 51 move upwardly with fork arms 36 as the fork arm assembly 31 is raised to lift a course of boards at pickup station 12. This movement brings posts 51 into engagement with the lower sides of stickers 10 at the sticker positions 50 (FIG. 3) and lifts them into engagement with members 52 to secure the stickers between posts 51 and member 52. This condition is maintained as the course support means 25 moves along the oblique forward path to bring a course 11 and a preceding supply of stickers 10 over stack 14. As fork arms 36 are lowered to move the course 11 into proximity of the top surface of stack 14, posts 51 are also lowered away from channels 52 releasing the stickers onto the sticker receiving means 45 while maintaining the stickers perpendicular to the boards in the stack.

Stickers 10 are supported on the sticker receiving means 45 until lifted therefrom by the sticker support means 26. Receiving means 45 is comprised of sets of spaced side brackets 46, 46a on framework 17. Brackets 46, 46a are rigidly fixed to framework 17 in order to receive stickers and support them elevationally below the table 21.

Sticker support means 26 is provided to lift stickers 10 from receiving means 45 and secure the stickers against the underside of a course 11 being moved from pickup station 12 to stacking station 13.

Sticker support means 26 is comprised of laterally-extending pairs of brackets 42, 42a fixed rigidly to fork arms 36. Brackets 42, 42a move upwardly with fork arms 36 to engage stickers 10 supported on brackets 46, 46a, and lift the stickers therefrom and place the stickers against the underside of the course. The brackets 42, 42a engage the stickers 10 intermediate their ends 10a and 10b (FIG. 6). The sticker lengths remain oriented substantially perpendicular to the lengths of boards within the course and stack as the stickers are moved with the course forward and laterally in the oblique or diagonal path.

The rearward bracket 42a of each bracket set is fixed to a respective fork arm 36 and extends laterally outward therefrom to support a sticker 10 forward of its trailing end 10a. Bracket 42a is positioned so that it does not come into contact with a stripping member 22 as the course support means 25 is retracted along the oblique path.

The stickers, because they are oriented perpendicular to the boards in the course, are angularly offset relative to the oblique path of the course support means 25. Thus trailing ends 10a protrude laterally outward from fork arms 36 a distance greater than the projection of rearward brackets 42a. The trailing sticker ends 10a are located in an intersecting path with stripping members 22 as shown in FIG. 6. As fork arms 35 are lowered onto stack 14, sticker trailing end 10a are also lowered in front of stripping members 22. Subsequent retraction of course support means 25 thereby serves to move the course 11 and trailing sticker ends 10a into abutment against stripping members 22. Further rearward movement of course 11 and stickers 10 is halted, and the brackets 42, 42a continue to move rearwardly and laterally with course support means 25 past stripping members 22. The course and stickers are therefore stripped from fork arms 36 and brackets 42, 42a onto the stack.

In the forward stroke of stacking machine 9, a course 11 and stickers 10, are brought forwardly and laterally up over the stripping members 22. Course 11 and stickers 10 are then lowered in front of members 22 bringing stickers 10 into elevational alignment with members 22. Members 22 project into the paths of sticker ends 10a as they are moved rearwardly with the return stroke of the stacking machine. Stripping members 22 engage sticker ends 10a and course 11 as brackets 42. 42a and fork arms 36 continue to retract. The stationary stripping members 22 thereby strip the course 11 and stickers 10 onto the stack without interfering with the rearward progression of fork arms 36 or brackets 42, 42a during the return stroke.

As briefly discussed above, drive means 27 is operated to move course support means 25 and sticker support means 26 simultaneously between pickup station 12 and stacking station 13. Drive means 27 includes a motor 57 (FIG. 1) mounted to carriage 30 for rotating a transversely spaced pair of upright crankshafts 58 through a chain and sprocket assembly 59. A pair of crank arms 61 extend horizontally from crankshafts 58 for rotation therewith. The outward ends of crank arms 61 are mounted by pins 62 to a pair of connecting links 63. The connecting links 63 extend from ends 62 to wrist pins 64 on frame 17. As motor 47 is operated, crank arms 61 rotate about the vertical axes of crankshafts 58 to move the course support means 25 in the reciprocating oblique path between pickup station 12 and stacking station 13.

Drive means 27 also includes a pair of cams 65 that operate to effect vertical movement of fork arm assembly 31. Cams 65 are crown-type cams and are fixed to crankshafts 58 for rotation therewith. A pair of followers 66 are mounted by upright rods 67 to fork arm assembly 41. Followers 66 engage and move vertically in response to the working surface of cam 65. Cam 65 is angularly positioned about the axes of crankshafts 58 so the fork arm assembly 51 is lifted thereby at pickup station 12 and lowered at stacking station 13. Continuous portions of the cam working surface serve to hold the fork arms in an elevated condition as the carriage is moved forwardly and maintain the fork arms at a lowered condition as they are retracted to strip the course and stickers onto stack 14. In the hoistless stacker arrangement, the cam would permit the fork arms to descend to the stack level during the retraction of the fork arms.

In operation, successive courses 11 and stickers 10 are delivered automatically to support surface 21 and sticker stations 50 respectively. The stickers are oriented perpendicular to the length of the course at stations 50 as is shown in FIG. 6. Motor 57 operates crank arms 61 to rotate against connecting links 63 initiating the forward stroke of carriage 30. As crankshafts 58 rotate, cams 65 rotate thereby raising fork arms 36 to pick up the course. Brackets 42, 42a also lift stickers 10 from brackets 46, 46a during this movement. Also, posts 51 are simultaneously raised to lift a subsequent set of stickers (at positions 50) against members 52.

Continued rotation of crank arms 61 moves the course 11, and stickers 10 forwardly toward stacking station 13 along the oblique path. Cams 65 include flat portions that maintain the elevation of fork arm assembly 31 during forward movement. This movement brings the course 11 and stickers 10 (held on sticker support means 26) to a position over stack 14 and in front of stripping members 22. The subsequent set of stickers on unloading means 47 are brought to positions over the sticker receiving means 45.

At this point, cams 65 allow fork arm assembly 31 to lower toward the stack, bringing stickers 10 thereon into elevational alignment with stationary stripping members 22. The subsequent set of stickers 10 held by unloading means 47 are simultaneously released onto receiving means 45.

During retraction of carriage 30, as crank arms 61 continue to rotate, cams 65 operate to maintain the fork arm assembly in the lowered condition. Course 11 is therefore brought against stripping members 22 and is stripped from fork arms 36 onto stack 14. Stickers also move against members 22, ceasing movement as brackets 42, 42a move along the oblique path, clear of members 22.

Complete retraction of carriage 30 brings fork arms 36, sticker support means 26 and unloading means 47 back to the original starting position in anticipation of the next cycle.

It should be understood that the above-described embodiments are simply illustrative of principles of this invention and that numerous other embodiments may be readily devised by those skilled in the art without deviating therefrom.

Therefore, only the following claims are intended to define this invention.

What I claim is:

1. A lumber stacking apparatus for receiving courses of boards and stickers at a course pickup station and for successively moving the courses of boards and stickers forwardly to a course stacking station and stacking the courses one on top of the other to form a stack with stickers placed crossways between the courses to vertically separate the courses in the stack, comprising:

a frame having guide tracks thereon extending between the course pickup station and the course stacking station an an oblique angle with respect to the longitudinal orientation of the boards in the stack;

course support means movably mounted on said tracks;

drive means operatively connecting the course support means and frame for moving the course support means to (a) engage and lift a course of boards at the pickup station, (b) move the course of boards forwardly and laterally along an oblique forward path while maintaining the course in the elevated condition, (c) lowering the course toward the stack at the stacking station, and (d) move rearwardly and laterally in an oblique rearward path from the course stacking station to the course pickup station in preparation for a successive course;

sticker support means responsive to movement of said course support means for supporting stickers crossways, relative to the lengths of boards in the course, beneath the engaged course as the course support means is moved from the pickup station to the stacking station along said oblique forward path; and stripping means on the framework at said course stacking station projecting into the oblique rearward path of the stickers as the course support means is moved rearwardly and laterally for engaging and stripping the stickers and course from the sticker support means and course support means respectively onto the stack.

2. The lumber stacking apparatus as set out in claim 1 wherein the sticker support means is comprised of sticker brackets on the course support means for engaging stickers intermediate their ends and for holding the stickers against the underside of the course as the course support means lifts the course and moves the course to the course stacking station.

3. The lumber stacking apparatus as set out in claim 2 wherein the stripping means are mounted on the framework in the rearward path of the stickers to engage one end of the stickers without interfering with the movement of the sticker brackets.

4. The lumber stacking apparatus as set out in claim 1 further comprising sticker receiving means at the course pickup station laterally offset from the stripping means for receiving and supporting stickers beneath a course of boards at a perpendicular orientation to the lengths of boards in said course.

5. The lumber stacking apparatus set out in claim 4 wherein the sticker receiving means is comprised of brackets mounted on the frame at said pickup station for receiving and supporting the stickers adjacent their ends.

6. The lumber stacking apparatus set out in claim 1 wherein the course support means is comprised of:
  a carriage movably mounted on said tracks for horizontal reciprocating movement between the course pickup station and stacking station; and
  a fork arm assembly mounted on the carriage for reciprocating movement with the carriage and for up and down movement relative to the carriage, in response to the drive means, whereby successive courses are lifted by the fork arm assembly as it is moved upward at the pickup station, and lowered at the course stacking station.

7. The lumber stacking machine set out in claim 6 wherein the sticker support means is comprised of sticker brackets on the fork arm assembly for engaging stickers intermediate their ends and holding the stickers against the underside of the course as the course is lifted at the pickup station and moved to the stacking station and stripped into the stack.

8. The lumber stacking apparatus set out in claim 7 further comprising sticker receiving means at the course pickup station for receiving and supporting stickers beneath a course of boards at the course pickup station at a perpendicular orientation to the lengths of boards in said course.

9. The lumber stacking apparatus set out in claim 8 further comprising sticker distribution means for supplying stickers to the sticker receiving means in coordination with movement of the course support means.

10. The lumber stacking apparatus set out in claim 9 wherein said sticker receiving means is comprised of brackets mounted on the frame below said pickup station.

11. The lumber stacking apparatus as set out in claim 8 wherein said sticker distribution means is comprised of:
  conveyor means for delivering stickers to selected sticker positions rearward of said pickup station; and
  sticker unloading means for removing stickers from the conveyor means while the course support means is moved forwardly between the pickup station and stacking station, and for releasing the stickers onto the sticker receiving means.

12. The lumber stacking apparatus set out in claim 11 wherein said sticker unloading means is comprised of:
  upright posts on said fork arm assembly at each selected sticker position and below the stickers at said locations; and
  longitudinal channel members mounted to the carriage each in vertical alignment with a respective post, said channel members being located elevationally above the stickers at said selected positions;
  whereby upward movement of the fork arm assembly at the pickup station brings the posts into contact with stickers at said selected positions and lifts them into abutment with the channel members, and downward movement of the fork arm assembly at the stacking station, lowers the posts to allow the stickers engaged thereby to become supported on said sticker receiving means.

* * * * *